United States Patent
Post (10) Patent No.: US 11,700,069 B2
(45) Date of Patent: Jul. 11, 2023

(54) EFFICIENT PHYSICAL LAYER FOR INTRABODY COMMUNICATION NETWORKS

(71) Applicant: Samsung Electronics Company, Ltd., Gyeonggi-do (KR)

(72) Inventor: Ernest Rehmatulla Post, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/931,146

(22) Filed: May 13, 2020

(65) Prior Publication Data

US 2021/0359768 A1    Nov. 18, 2021

(51) Int. Cl.
*H04B 13/00* (2006.01)
*H04J 11/00* (2006.01)
*H04L 27/26* (2006.01)

(52) U.S. Cl.
CPC ........ *H04B 13/005* (2013.01); *H04J 11/0023* (2013.01); *H04L 27/2634* (2013.01)

(58) Field of Classification Search
CPC . H04B 13/005; H04B 5/0012; H04L 27/2626; H04L 27/2627; H04L 27/2628; H04L 27/2634; H04L 27/2647; H04L 27/2649; H04L 27/265; H04L 27/26524; H04L 1/004; H04L 1/0041; H04L 1/0045; G06F 3/011
See application file for complete search history.

(56) References Cited

U.S. PATENT DOCUMENTS

| | | | | |
|---|---|---|---|---|
| 7,715,460 B2* | 5/2010 | Tsai | ...................... | H04L 5/0037 375/131 |
| 8,185,048 B2* | 5/2012 | Hebiguchi | ........... | H04B 13/005 455/41.1 |
| 8,633,809 B2* | 1/2014 | Schenk | ................ | H04B 13/005 340/545.4 |
| 8,693,306 B2 | 4/2014 | Hwang | | |
| 8,699,950 B2* | 4/2014 | Kubono | ................ | H04B 13/005 455/41.1 |
| 9,425,905 B2 | 8/2016 | Lee | | |

(Continued)

FOREIGN PATENT DOCUMENTS

| | | |
|---|---|---|
| EP | 3474468 | 4/2019 |
| JP | 2013-121034 | 6/2013 |
| KR | 10-2017-0086943 | 7/2017 |

OTHER PUBLICATIONS

Zimmerman, Thomas G., "Personal Area Networks: Near-field intrabody communication," IBM Systems Journal, vol. 35, Nos. 3&4, 1996, Accepted for publication Apr. 8, 1996, 609-617 pgs.

(Continued)

*Primary Examiner* — Betsy Deppe (57) ABSTRACT

A method includes receiving an input via a processor of the computing device. The input corresponds to data to be transmitted. The method further includes encoding the data to generate spreading codes corresponding at least in part to the data. The method further includes mapping the spreading codes to one or more frequency subcarriers of a plurality of frequency subcarriers, generating a transmit signal based at least in part on the one or more frequency subcarriers, and transmitting the transmit signal via an electrode capacitively coupled to a physical body. The transmit signal is transmitted from the electrode through the physical body.

20 Claims, 6 Drawing Sheets

(56) References Cited

U.S. PATENT DOCUMENTS

| | | | | |
|---|---|---|---|---|
| 2005/0063327 | A1* | 3/2005 | Krauss | H04L 5/0021 370/320 |
| 2010/0040114 | A1* | 2/2010 | Kim | H04B 13/005 375/130 |
| 2013/0148695 | A1* | 6/2013 | Gunter | H04L 5/22 375/141 |
| 2015/0301644 | A1* | 10/2015 | Walley | H04B 13/005 345/174 |
| 2017/0244543 | A1* | 8/2017 | Raj | H04Q 9/00 |
| 2018/0287717 | A1 | 10/2018 | Fukuda | |
| 2019/0346928 | A1* | 11/2019 | Shahmohammadi | H04B 13/005 |
| 2022/0074691 | A1* | 3/2022 | Delgado Acarreta | A43B 3/34 |

OTHER PUBLICATIONS

Zhao, Jian Feng, et al., "A Review on Human Body Communication: Signal Propagation Model, Communication Performance, and Experimental Issues," Hindawi, Wireless Communications and Mobile Computing, vol. 2017, Article ID 5842310, https://doi.org/10.1155/2017/5842310, Published Oct. 22, 2017, 16 pgs..

"IEEE Standard for Local and metropolitan area networks—Part 15.6: Wireless Body Area Networks," IEEE Computer Society, Sponsored by the LAN/MAN Standards Committee, IEEE Std 802.15.6™—2012, Feb. 29, 2012, ISBN 978-0-7381-7206-4, downloaded Sep. 27, 2017 at 23:14:59 UTC from IEEE Xplore, 271 pgs.

Post, E. Rehmi, et al., "Intrabody Buses for Data and Power," Physics and Media, MIT Media Laboratory, Cambridge, MA 02142, 0-8186-8192-6/97, © 1997 IEEEE, pp. 52-55.

\* cited by examiner

EFFICIENT PHYSICAL LAYER FOR INTRABODY COMMUNICATION NETWORKS

TECHNICAL FIELD

This disclosure relates generally to intrabody communication networks, and, more specifically, to an efficient physical layer for intrabody communication networks.

BACKGROUND

Human body communication (HBC), or, more aptly, intrabody communication typically involves utilizing the human anatomy (e.g., tissue) or other somatic medium as the transmission and reception channel for transferring data. For example, such data that may be transferred by way of intrabody communication may include medical data, tracking data, location data, timing data, or information that may be purposeful with respect to one or more persons. Thus, as it may be appreciated, whether or not an intrabody communication device will be suitable for such applications may depend upon, for example, the reliability of the intrabody communication network as supported by the device. However, as the human anatomy (e.g., tissue) or other similar somatic medium may generally include a highly lossy and variable channel for data transfer, devices requiring precise channel characteristics and transmission parameters may experience greater distortion of the received signal than can be tolerated, and thus leading to corruption of the data to be transferred. Accordingly, it may be useful to provide improved intrabody communication devices.

DESCRIPTION OF EXAMPLE EMBODIMENTS

The present embodiments are directed toward an efficient physical layer for providing improved channel characteristics and modulation techniques in intrabody communication networks. In certain embodiments, during a transmitting phase of the present embodiments, the physical layer may receive an input data signal corresponding to one or more data symbols. For example, in some embodiments, the physical layer may receive a data stream (e.g., bitstream), which may be subsequently encoded (e.g., error correcting code) utilizing an [n, k, m] convolutional encoder (e.g., [1, 2, 9] convolutional encoder) or a forward error correction (FEC) encoder to increase the coding gain of the input data signal. The physical layer may then encode the one or more data symbols into a matrix W to generate spreading codes corresponding to the one or more data symbols. For example, in certain embodiments, the physical layer may encode the one or more data symbols utilizing an N×N Hadamard matrix (e.g., 8×8 Hadamard matrix) of Walsh spreading codes (e.g., Walsh-Hadamard spread-spectrum modulation) for performing data error correction and autocorrelation, and increasing the signal interference rejection of the transmit signal that will be ultimately transmitted.

In certain embodiments, the physical layer may then map the spreading codes to one or more frequency subcarriers of a single frequency carrier channel. For example, the physical layer may map the Walsh spreading codes to one or more of 32 frequency bins of, for example, a single frequency carrier channel in a range of 100 kilohertz (kHz) to 1.5 megahertz (MHz). The physical layer may then generate a transmit signal based on the one or more frequency subcarriers. For example, in some embodiments, the physical layer may utilize an inverse fast Fourier transform (IFFT) in conjunction with a digital-to-analog (DAC) to convert a discrete data signal (e.g., discrete data signal including the one or more frequency subcarriers in the frequency domain) into a continuous data signal (e.g., a time-varying data signal in the time domain). Indeed, the continuous data signal may be then amplified via a transmitting power amplifier (PA) or a transmitting high voltage PA (e.g., a high voltage PA rated at 24 volt (V) or less) to increase the gain of the continuous data signal for transmission.

In certain embodiments, the physical layer may then transmit the transmit signal through a physical body (e.g., anatomy of a human, anatomy of an animal, or other animate or inanimate somatic medium) via an electrode capacitively coupled to the physical body. For example, in some embodiments, the physical layer may include a transmitter electrode selection and coupling network that may be coupled to one or more transmitter electrodes for transmitting the transmit signal (e.g., continuous data signal) through the anatomy of a user. Specifically, during the transmitting phase, the anatomy (e.g., skin) of a user may serve as the receiving electrode, and thus once the user may touch or hover over the transmitting electrode of the physical layer, the transmit signal may be transmitted (e.g., via capacitive coupling) through the anatomy of the user. In one embodiment, the transmitter electrode may correspond to, for example, an indium tin oxide (ITO) electrode layer that may be integrated together with a display of a mobile electronic device and/or a wearable electronic device. In another embodiment, the transmitting electrode may include, for example, a conductive carbon-loaded plastic electrode layer that may be integrated together with the display or the backside surface of the mobile electronic device and/or wearable electronic device. Further, as the physical layer may rely on differential capacitive coupling for data transmission and reception with the anatomy of the user, in some embodiments, the transmitter electrode selection and coupling network of the physical layer may also include a number of switches or multiplexers (MUXs) for selecting one or more particular transmitter electrodes, for example, to maximize a total differential capacitive coupling between the transmitter electrode and the anatomy of the user. Moreover, it should be appreciated that while direct user anatomy contact (e.g., finger touch, hand contact, skin contact) with a conductive material (e.g., ITO electrodes, conductive carbon-loaded plastic electrodes) may create a lower-impedance capacitive coupling, because the present techniques rely on capacitive coupling, data signals may also be passed to and from the electrodes through one or more insulating layers before reaching the anatomy of the user without any distortion to the data signal and/or the information contained therein. Indeed, suitable insulating layers such as, one or more dielectric media may be used to guide and concentrate the electric field between the electrodes and the anatomy of the user, thereby increasing the capacitive coupling.

Similarly, in certain embodiments, during a receiving phase, the physical layer may receive a receive signal (e.g., continuous data signal) via a receiving electrode capacitively coupled to the anatomy of the user. Specifically, during the receiving phase, the anatomy of the user may serve as the transmitting electrode, and thus once the user may touch or hover over the receiving electrode of the physical layer, the receive signal may be received (e.g., via capacitive coupling) from the anatomy of the user to the receiving electrode of the physical layer. In certain embodiments, after the receive signal (e.g., continuous data signal) is detected at the receive electrode, the physical layer may then amplify the receive signal via a receiving PA. The physical layer may then utilize a fast Fourier transform (FFT) in conjunction with an analog-to-digital (ADC) to convert the receive signal (e.g., continuous data signal) into a discrete data signal (e.g., discrete data signal including one or more frequency subcarriers in the frequency domain). In certain embodiments, the physical layer may then translate the frequency subcarriers of the discrete data signal into a Hadamard matrix of Walsh spreading codes, and translate the Walsh spreading codes to correspond to one or more data symbols. The physical layer may then decode the one or more data symbols utilizing, for example, a Viterbi decoder or other similar decoder to retrieve a data stream (e.g., bitstream) included in the receive signal. In this way, the presently disclosed techniques may provide improved channel characteristics (e.g., coding gain, error correction, signal interference rejection, and so forth) and modulation techniques (e.g., Walsh-Hadamard spread-spectrum modulation), and, by extension, may improve the efficiency and robustness of intrabody communication networks.

Furthermore, the presently disclosed techniques may allow various technical advantages and applications. For example, the presently disclosed efficient physical layer for intrabody communication networks may enhance the modes of interaction (e.g., user touch, user touch gestures, user hover) between users and personal electronic devices by providing the ability for users to more intimately interact with other users while, in most instances, only indirectly interacting with the user's personal electronic device (e.g. simply grasping the personal electronic device using one hand, simply having the personal electronic device stowed into a pocket or carry-bag of the user, or simply having the personal electronic device worn on the wrist or around the neck of the user). That is, the personal electronic device of the user may transfer data between itself and one or more other external electronic devices (e.g., corresponding to other users) by way of the user simply touching the other user or the one or more other external electronic devices.

For example, in one instance, a personal electronic device of the user may be inside a shirt pocket of user or simply worn on the wrist of the user, and the user may be allowed to unlock an electronic door lock by manually grasping the handle to the door (e.g., without the user removing the personal electronic device from her pocket and without the user lifting the personal electronic device worn on her wrist to the electronic door lock). In another instance, the user may be allowed, for example, to exchange business cards or other information through a simple handshake with another user, a hug of another user, a tap on the shoulder of another user, or a handwave to another user closely proximate to the user. Still, in another instance, the user may be allowed to be authorized or authenticated via a public reader or other device, and thus making a secure personalized experience without any explicit sign-in process having to be performed by the user. It should be appreciated that these practical applications are included merely as examples, in actual implementation, the presently disclosed techniques may be applied in any of various technical applications. Moreover, while the presently disclosed embodiments may be discussed herein primarily with respect to a human anatomy, it should be appreciated that the presently disclosed techniques may be applied with respect to any somatic medium (e.g., humans, animals, insects, certain organisms, and so forth). For example, in one instance, an electronic collar or other wearable device attached to the anatomy of a pet (e.g., puppy, kitten) may be used to allow the pet to access an electronically locked door or fence, temporarily disable invisible fencing, or other similar application.

Figure 1A:
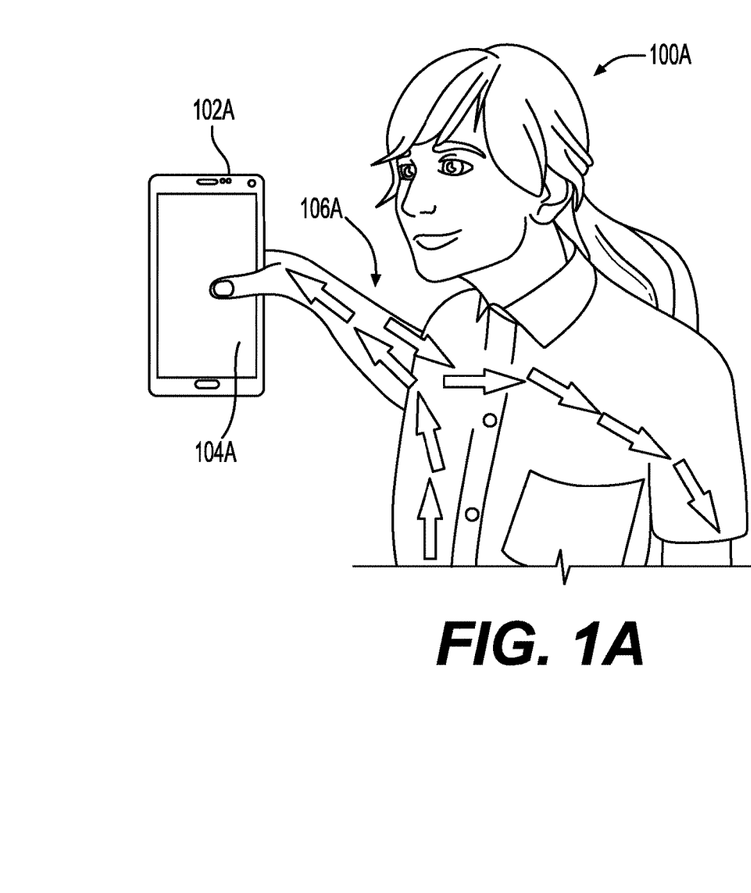
FIG. 1A illustrates an example of an intrabody communication network.
Figure 1B:
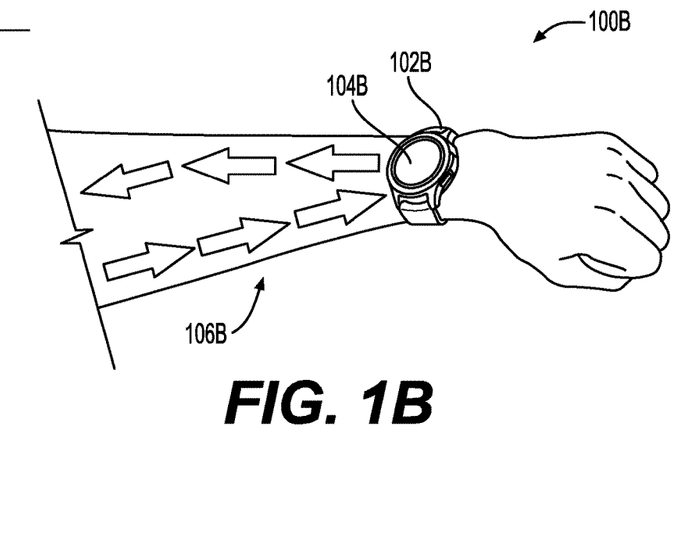
FIG. 1B illustrates another example of an intrabody communication network.

With the forgoing in mind, it may be useful to describe one or more example intrabody communication networks, as illustrated by FIG. 1A and FIG. 1B. For example, in certain embodiments, an intrabody communication network (e.g., human body communication (HBC) network) may include a user body 100A and user body 100B, which may each interact, for example, with a personal electronic device 102A and a personal electronic device 102B, respectively. In one embodiment, the personal electronic device 102A may include, for example, a mobile electronic device (e.g., a mobile phone, a tablet computer, a laptop computer, and so forth) that the user may carry in her hand, inside of her shirt pocket, or inside of her purse, for example. Similarly, in one embodiment, the personal electronic device 102B may include, for example, a wearable electronic device (e.g., a watch, an exercise tracker, a medical wristband device, an armband device, and so forth) that the user may wear, for example, around her wrist, around her forearm, or around her neck.

In certain embodiments, in accordance with the presently disclosed techniques, the personal electronic devices 102A, 102B may transmit and receive data via a capacitive coupling with the user body 100A, 100B. Specifically, the user body 100A, 100B may be utilized as a transmission and reception medium for data signal transfers between, for example, the personal electronic devices 102A, 102B and one or more external electronic devices (e.g., corresponding to other users). For example, as will be further appreciated with respect to FIGS. 2A, 2B, and 3, the personal electronic devices 102A, 102B may include one or more electrodes (e.g., integrated as part of the electronic displays 104A, 104B of the personal electronic devices 102A, 102B or along a backside and/or underneath surface of the personal electronic devices 102A, 102B) that may be excited in response to a user touch or hover, and may establish one or more data channels 106A, 106B (e.g., a displacement current of the entire user body) with the user body 100A, 100B to flow therethrough and therefrom. It should be appreciated that the arrows depicting the one or more data channels 106A, 106B are merely illustrative examples of directions of data flow with respect to the user body 100A, 100B, and thus are not necessarily representative of a particular real-world current flow path. For example, in one instance of an actualized implementation of the presently disclosed embodiments, a transmitting device that modulates user body 100A, 100B voltage, which may lead to a capacitively-coupled displacement current at a receiving device would also be included.

Figure 2A:
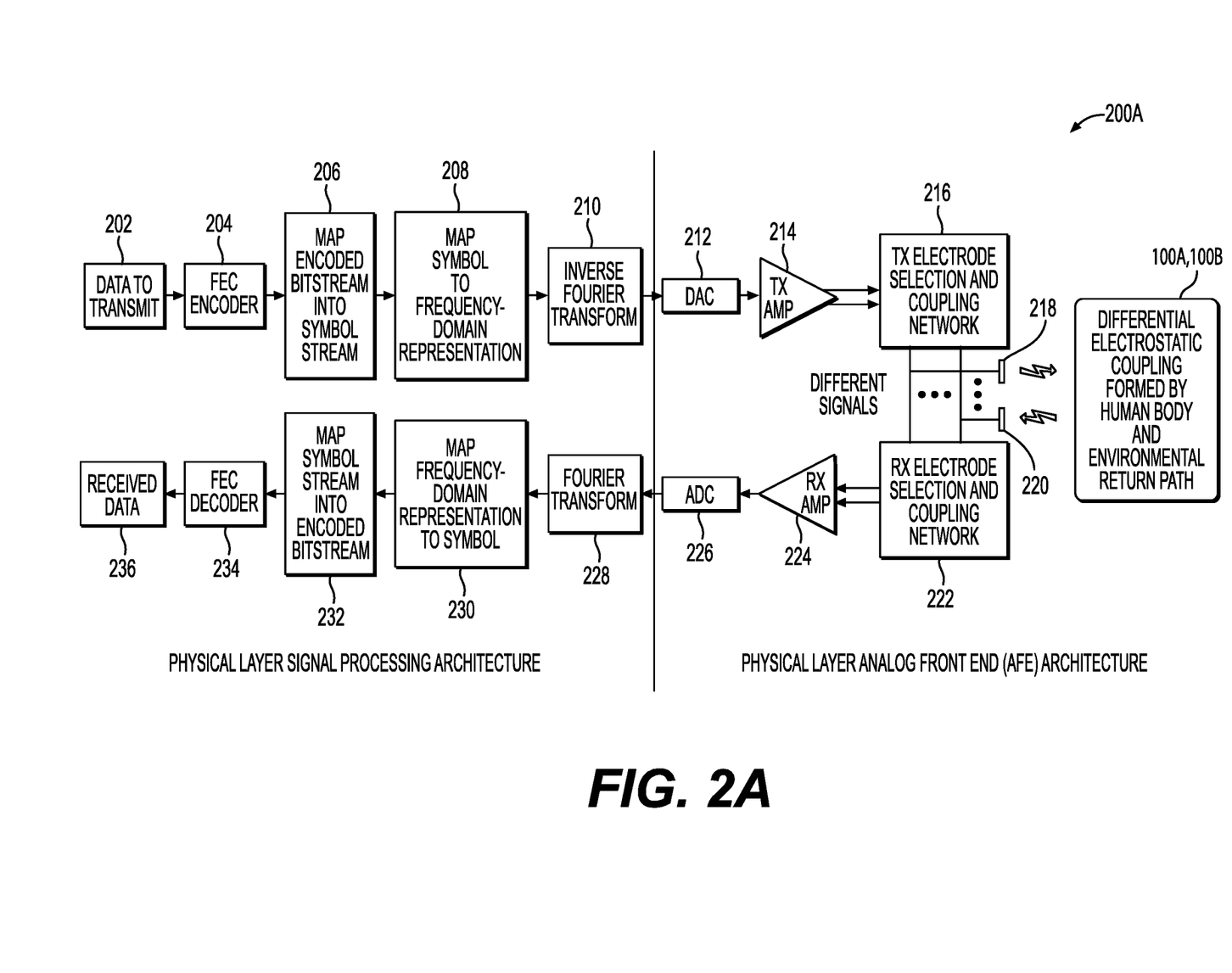
FIG. 2A illustrates an embodiment of an efficient physical layer for providing improved channel characteristics and modulation techniques in intrabody communication networks.

FIG. 2A illustrates an efficient physical layer 200A (e.g., that may be included within the personal electronic devices 102A, 102B) for providing improved channel characteristics and modulation techniques in intrabody communication networks, in accordance with the presently disclosed embodiments. It should be appreciated that the various functional blocks of the physical layer 200A illustrated by FIG. 2A may include, for example, hardware elements (e.g., circuitry and/or combinational logic such as the one or more processor(s)), software elements (e.g., one or more software systems or other computer code that may be stored on a computer-readable medium), or some combination of both hardware elements and software elements.

In certain embodiments, during a transmitting phase, the physical layer 200A may receive an input data signal 202. For example, in one embodiment, the input data signal 202 may include an N-bit bitstream (e.g., 16-bit bitstream, 32-bit bitstream, 64-bit bitstream, 128-bit bitstream, 256-bit bitstream, and so forth) to be transmitted, for example, to the user body 100A, 100B via capacitive coupling. As further depicted in FIG. 2A, the input data signal 202 may be then passed to forward error correction (FEC) encoder block 204 that may be utilized to encode the input data signal 202 into a set of error correction codes (e.g., convolutional error code, turbo error code), for example, for enhancing the reliability of the N-bit bitstream by introducing data redundancy. Specifically, by generating the particular set of error correction codes, the FEC encoder block 204 may increase the coding gain of the transmit signal that will be ultimately transmitted. The FEC encoder block 204 may then output the set of error correction codes to a functional matrix block 206.

In certain embodiments, the functional matrix block 206 may include an N×N Hadamard matrix (e.g., 8×8 Hadamard matrix, 16×16 Hadamard matrix, 32×32 Hadamard matrix, 64×64 Hadamard matrix, and so forth) that may be utilized to transform the set of error correction codes into a matrix of Walsh spreading codes. For example, in one embodiment, the functional matrix block 206 may include, for example, an 8×8 Hadamard matrix, which may include a total of 64 Walsh spreading codes corresponding to the set of error correction codes based on autocorrelation or cross-correlation, for example. Indeed, in some embodiments, the Walsh spreading codes may include a set of orthogonal frequency multiplexing division (OFDM) data symbols utilized to modulate a single carrier frequency channel (e.g., ranging from approximately 100 kHz up to approximately 1.5 MHz) to minimize, for example, the bandwidth of the transmit signal to be ultimately transmitted. Particularly, by performing the forgoing Walsh-Hadamard spread-spectrum modulation, the functional matrix block 206 may increase the signal interference rejection of the transmit signal that will be ultimately transmitted. Additionally, by employing the single carrier frequency channel in the range of 100 kHz to 1.5 MHz, radiative coupling between the user body 100A, 100B and free space may be reduced, and, further, the physical layer analog front end (AFE) architecture of the physical layer 200A may be simplified (e.g., through utilizing low cost and less robust analog-to-digital converters (ADCs) and digital-to-analog converters (DACs)). This may reduce power consumption of the physical layer 200A.

In certain embodiments, the functional matrix block 206 may then pass the Walsh spreading codes to a frequency-domain functional block 208. For example, the frequency-domain functional block 208 may generate a discrete data signal including a set of frequency subcarriers (e.g., in the frequency domain) corresponding to the Walsh spreading codes. Specifically, the frequency-domain functional block 208 may map the Walsh spreading codes to one or more of, for example, 32 total frequency bins of a single carrier frequency channel (e.g., ranging from approximately 100 kHz up to approximately 1.5 MHz) in the frequency domain. As further depicted by FIG. 2A, the frequency-domain functional block 208 may then pass the discrete data signal (e.g., including the set of frequency subcarriers) to an IFFT functional block 210.

In some embodiments, the IFFT functional block 210 in conjunction with the DAC 212 (e.g., R-string DAC, R-2R DAC, binary weighted DAC, and so forth) may be utilized to convert the discrete data signal (e.g., including the set of frequency subcarriers in the frequency domain) into a continuous data signal (e.g., a time-varying data signal in the time domain). The continuous data signal may be then amplified for transmission via a transmitting power amplifier (PA) 214, which may include, for example, an operation amplifier (OpAmp) utilize to amplify the voltage of the continuous data signal to generate a signal for effective transmission.

In certain embodiments, as further illustrated in FIG. 2A, the PA 214 may then provide the transmit signal to a transmitter electrode selection and coupling network 216. Specifically, the transmitter electrode selection and coupling network 216 may be provided to select (e.g., utilizing one or more switches or MUXs) one or more transmitting electrodes 218 for signal transmission. For example, in some embodiments, the transmitter electrode selection and coupling network 216 may be coupled to the one or more transmitter electrodes 218 for transmitting the transmit signal through, for example, through the user body 100A, 100B via the one or more transmitting electrodes 218 capacitively coupled to the user body 100A, 100B (e.g., by way of the personal electronic devices 102A, 102B).

In some embodiments, the one or more transmitter electrodes 218 may correspond to, for example, an indium tin oxide (ITO) electrode layer that may be integrated together with a display of the personal electronic devices 102A, 102B. In another embodiment, the one or more transmitter electrodes 218 may include, for example, a conductive carbon-loaded plastic electrode layer that may be integrated together with the display or the backside surface of the personal electronic devices 102A, 102B. Further, as the physical layer 200A may rely on differential capacitive coupling for data transmission and reception with the user body 100A, 100B, in some embodiments, the transmitter electrode selection and coupling network 216 may also include a number of switches or multiplexers (MUXs) for selecting one or more particular transmitter electrodes, for example, to maximize a total differential capacitive coupling between the one or more transmitter electrodes 218 and the user body 100A, 100B. Moreover, it should be appreciated that while direct user body 100A, 100B contact (e.g., finger touch, hand contact, skin contact) with the electrodes 218 (e.g., ITO electrode, conductive carbon-loaded plastic electrode) may create a lower-impedance capacitive coupling, because the present techniques rely on capacitive coupling, data signals may also be passed to and from the electrodes 218 through one or more insulating layers before reaching the user body 100A, 100B without any distortion to the data signal and/or the information contained therein. Indeed, in some embodiments, suitable insulating layers such as, one or more dielectric media may be used to guide and concentrate the electric field between the electrodes 218 and the user body 100A, 100B, thereby increasing the capacitive coupling.

As further depicted in FIG. 2A, in certain embodiments, during a receiving phase of the physical layer 200A, a receive signal (e.g., continuous data signal) via one or more receiving electrodes 220 capacitively coupled to the user body 100A, 100B. For example, during the receiving phase of the physical layer 200A, the user body 100A, 100B may serve as the transmitting electrode, for example, and thus once the user may touch or hover over the one or more receiving electrodes 220, the receive signal may be received (e.g., via capacitive coupling) from the user body 100A to the one or more receiving electrodes 220. As illustrated, in some embodiments, after the receive signal is detected at the one or more receiving electrodes 220, the receive signal may be passed to receive electrode selection and coupling network 222.

In certain embodiments, receive electrode selection and coupling network 222 may then pass the receive signal to a receive PA 224 (e.g., OpAmp) to amplify (e.g., increase signal intensity) the receive signal for processing. The receive PA 224 (e.g., OpAmp) may then pass the amplified receive signal to analog-to-digital converter (ADC) 226. In some embodiments, the ADC 226 in conjunction with a fast Fourier transform (FFT) functional block 228 to convert the receive signal (e.g., continuous data signal) into a discrete data signal (e.g., discrete data signal including the one or more frequency subcarriers in the frequency domain). The FFT functional block 228 may then pass the discrete data signal (e.g., discrete data signal including one or more frequency subcarriers in the frequency domain) to a frequency-domain functional block 230.

In certain embodiments, the frequency-domain functional block 230 may translate, the discrete data signal (e.g., discrete data signal including one or more frequency subcarriers in the frequency domain) into a set of Walsh spreading codes. Specifically, the frequency-domain functional block 230 may demodulate the discrete data signal (e.g., including the one or more frequency subcarriers in the frequency domain) into a set of Walsh spreading codes (e.g., OFDM data symbols). The frequency-domain functional block 230 may then provide an output to the functional matrix block 232. In some embodiments, the functional matrix block 232 may include an N×N Hadamard matrix (e.g., 8×8 Hadamard matrix, 16×16 Hadamard matrix, 32×32 Hadamard matrix, 64×64 Hadamard matrix, and so forth) that may be utilized to translate the Walsh spreading codes (e.g., OFDM data symbols) into a set of error correction codes.

In certain embodiments, the functional matrix block 232 may then pass the set of error correction codes to an FEC decoder 234. The FEC decoder 234 may then decode the error correction codes to retrieve a received data stream 236 (e.g., bitstream) included in the original receive signal as detected at the one or more receive electrodes 220. In one embodiment, the received data stream 236 (e.g., bitstream) may be identical to the data received at the one or more receiving electrodes 220 (e.g., identical to the original data as intended to be received). In another embodiment, the received data stream 236 (e.g., bitstream) may include, for example, a probability distribution or data vector in which the original received data stream 236 may be recovered based on the data symbols having the highest probabilities along the distribution. In this way, the present efficient physical layer 200A may provide improved channel characteristics (e.g., coding gain, error correction, signal interference rejection, and so forth) and modulation techniques (e.g., Walsh-Hadamard spread-spectrum modulation), and, by extension, may improve the efficiency and robustness of intrabody communication networks.

Figure 2B:
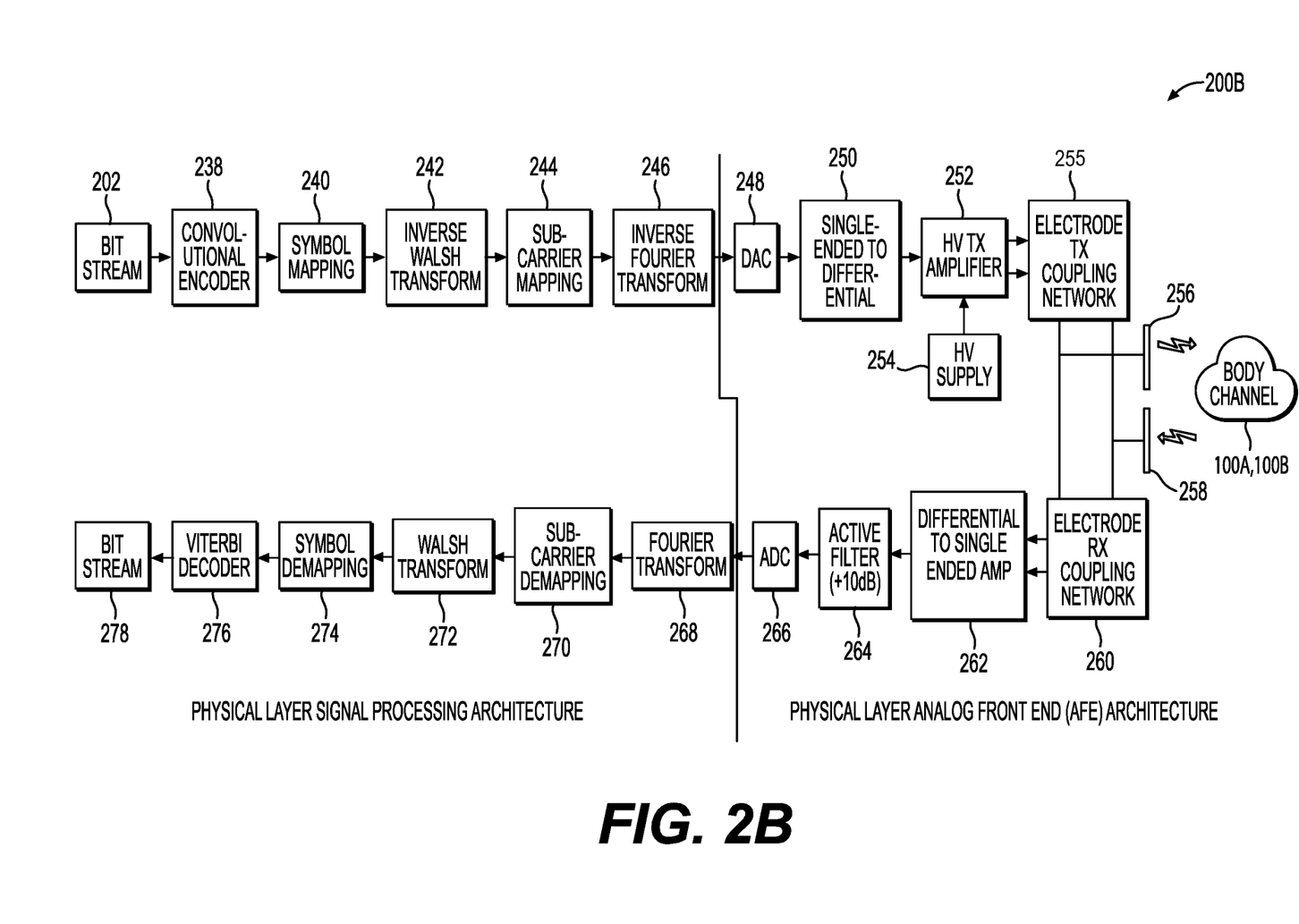
FIG. 2B illustrates another embodiment of an efficient physical layer for providing improved channel characteristics and modulation techniques in intrabody communication networks.

FIG. 2B illustrates another embodiment of an efficient physical layer 200B (e.g., that may be included within the personal electronic devices 102A, 102B) for providing improved channel characteristics and modulation techniques in intrabody communication networks, in accordance with the presently disclosed embodiments. It should be appreciated that the various functional blocks of the physical layer 200B illustrated by FIG. 2B may include, for example, hardware elements (e.g., circuitry and/or combinational logic such as the one or more processor(s)), software elements (e.g., one or more software systems or other computer code that may be stored on a computer-readable medium), or some combination of both hardware elements and software elements.

In certain embodiments, during a transmitting phase, the physical layer 200B may receive an input data signal 202. For example, in one embodiment, the input data signal 202 may include an N-bit bitstream (e.g., 16-bit bitstream, 32-bit bitstream, 64-bit bitstream, 128-bit bitstream, 256-bit bitstream, and so forth) to be transmitted, for example, to the user body 100A, 100B via capacitive coupling. As further depicted in FIG. 2B, the input data signal 202 may be then passed to a [n, k, m] convolutional encoder 238 (e.g., in which n corresponds to a number of bits generated at the output of the convolutional encoder 238 per time period; k corresponds to a number of bits shifted into the input of the convolutional encoder 238 per time period; and m corresponds to a number of bits previously shifted into the input of the convolutional encoder per time period) that may be utilized to encode the input data signal 202 into a codeword (e.g., convolutional error code), for example. In one embodiment, the convolutional encoder 238 may include, for example, a [1, 2, 9] convolutional encoder. Specifically, by encoding the input data signal 202 into a particular codeword (e.g., convolutional error code), the convolutional encoder 238 may increase the coding gain of the transmit signal that will be ultimately transmitted. The convolutional encoder 238 may then output the encoded codeword to a symbol mapping functional block 240.

In certain embodiments, the symbol mapping functional block 240 and the inverse Walsh transform block 242 may include an N×N Hadamard matrix (e.g., 8×8 Hadamard matrix, 16×16 Hadamard matrix, 32×32 Hadamard matrix, 64×64 Hadamard matrix, and so forth) that may be utilized to transform the encoded codeword into a matrix of Walsh spreading codes. For example, in one embodiment, the inverse Walsh transform block 242 may include, for example, an 8×8 Hadamard matrix, which may include a total of 64 Walsh spreading codes corresponding to the encoded codeword through, for example, autocorrelation or cross-correlation. As previously discussed, the Walsh spreading codes may include a set of OFDM data symbols utilized to modulate a single carrier frequency channel (e.g., ranging from approximately 100 kHz up to approximately 1.5 MHz) to minimize, for example, the bandwidth of the transmit signal to be ultimately transmitted. Particularly, by performing the forgoing Walsh-Hadamard spread-spectrum modulation, the symbol mapping functional block 240 and the inverse Walsh transform block 242 may increase the signal interference rejection of the transmit signal that will be ultimately transmitted. Additionally, by employing the single carrier frequency channel in the range of 100 kHz to 1.5 MHz, radiative coupling between the user body 100A, 100B and free space may be reduced, and, further, the physical layer AFE architecture of the physical layer 200B may be simplified (e.g., through utilizing low cost and less robust ADCs and DACs). This may reduce power consumption of the physical layer 200B.

In certain embodiments, the inverse Walsh transform block 242 may then pass the Walsh spreading codes to a frequency subcarrier block 244. For example, the frequency subcarrier block 244 may generate a discrete data signal including a set of frequency subcarriers (e.g., in the frequency domain) corresponding to the Walsh spreading codes. As further depicted by FIG. 2A, the frequency-domain functional block 208 may then pass the discrete data signal (e.g., including the set of frequency subcarriers) to an IFFT functional block 246. In some embodiments, the IFFT functional block 246 in conjunction with the DAC 248 (e.g., R-string DAC, R-2R DAC, binary weighted DAC, and so forth) may be utilized to convert the discrete data signal (e.g., including the set of frequency subcarriers in the frequency domain) into a continuous data signal (e.g., a time-varying data signal in the time domain). The DAC 248 may then provide an output to a single-ended differential functional block 250 and a high-voltage PA 252 (e.g., differential OpAmp). Specifically, the single-ended differential functional block 250 may operate in conjunction with a high-voltage PA 252 to convert a single-ended continuous data signal into a differential continuous data signal.

In some embodiments, the high voltage PA 252 may be coupled to a high voltage power supply 254. For example, the high voltage power supply 254 may be provided to amplify the differential continuous data signal to a high voltage (e.g., 24V or less) to increase the gain of the differential continuous data signal. The high voltage PA 252 may then pass the differential continuous data signal to a transmitter electrode selection and coupling network 255. Specifically, the transmitter electrode selection and coupling network 255 may be provided to select (e.g., utilizing one or more switches or MUXs) one or more transmitting electrodes 256 for transmitting the transmit signal through, for example, the user body 100A, 100B via the one or more transmitting electrodes 256 capacitively coupled to the user body 100A, 100B.

As further depicted in FIG. 2B, in certain embodiments, during a receiving phase of the physical layer 200B, a receive signal (e.g., continuous data signal) via one or more receiving electrodes 258 capacitively coupled to the user body 100A, 100B. For example, during the receiving phase of the physical layer 200B, the user body 100A, 100B may serve as the transmitting electrode, for example, and thus once the user may touch or hover over the one or more receiving electrodes 258, the receive signal may be received (e.g., via capacitive coupling) from the user body 100A, 100B to the one or more receiving electrodes 258. As illustrated, after the receive signal is detected at the one or more receiving electrodes 258, the receive signal may be passed to receive electrode selection and coupling network 260.

In certain embodiments, the receive electrode selection and coupling network 260 may then pass the receive signal to a receive differential to single ended PA 262 (e.g., differential OpAmp) to amplify the receive signal for processing. The receive differential to single ended PA 262 (e.g., differential OpAmp) may then pass the amplified receive signal to an active filter 264 (e.g., mixer) to increase the gain of the receive signal. The active filter 264 may then provide an output to an ADC 266. In some embodiments, the ADC 266 in conjunction with an FFT functional block 268 converts the receive signal (e.g., continuous data signal) into a discrete data signal (e.g., discrete data signal including one or more frequency subcarriers in the frequency domain). The FFT functional block 268 may then pass the discrete data signal (e.g., discrete data signal including one or more frequency subcarriers in the frequency domain) to a frequency subcarrier demapping functional block 270.

In certain embodiments, the frequency subcarrier demapping functional block 270 may translate, the discrete data signal (e.g., discrete data signal including one or more frequency subcarriers in the frequency domain) into a set of Walsh spreading codes. Specifically, the frequency subcarrier demapping functional block 270 may demodulate the discrete data signal (e.g., including one or more frequency subcarriers in the frequency domain) into a set of Walsh spreading codes (e.g., OFDM data symbols). The frequency subcarrier demapping functional block 270 may then provide an output to a Walsh transform functional block 272. In some embodiments, the transform functional block 272 may, in conjunction with a symbol demapping functional block 274, may be utilized to translate the Walsh spreading codes (e.g., OFDM data symbols) into a set of error correction codes.

In certain embodiments, the symbol demapping functional block 274 may then pass the set of error correction codes to a Viterbi decoder 276. The Viterbi decoder 276 may then decode the error correction codes to retrieve a received data stream 278 (e.g., bitstream) included in the original receive signal as detected at the one or more receive electrodes 258. In one embodiment, the received data stream 278 (e.g., bitstream) may be identical to the data received at the one or more receiving electrodes 258 (e.g., identical to the original data as intended to be received). In another embodiment, the received data stream 278 (e.g., bitstream) may include, for example, a probability distribution or data vector in which the original received data stream 278 may be recovered based on the data symbols having the highest probabilities along the distribution. In this way, the present efficient physical layer 200B may provide improved channel characteristics (e.g., coding gain, error correction, signal interference rejection, and so forth) and modulation techniques (e.g., Walsh-Hadamard spread-spectrum modulation), and, by extension, may improve the efficiency and robustness of intrabody communication networks.

Figure 3:
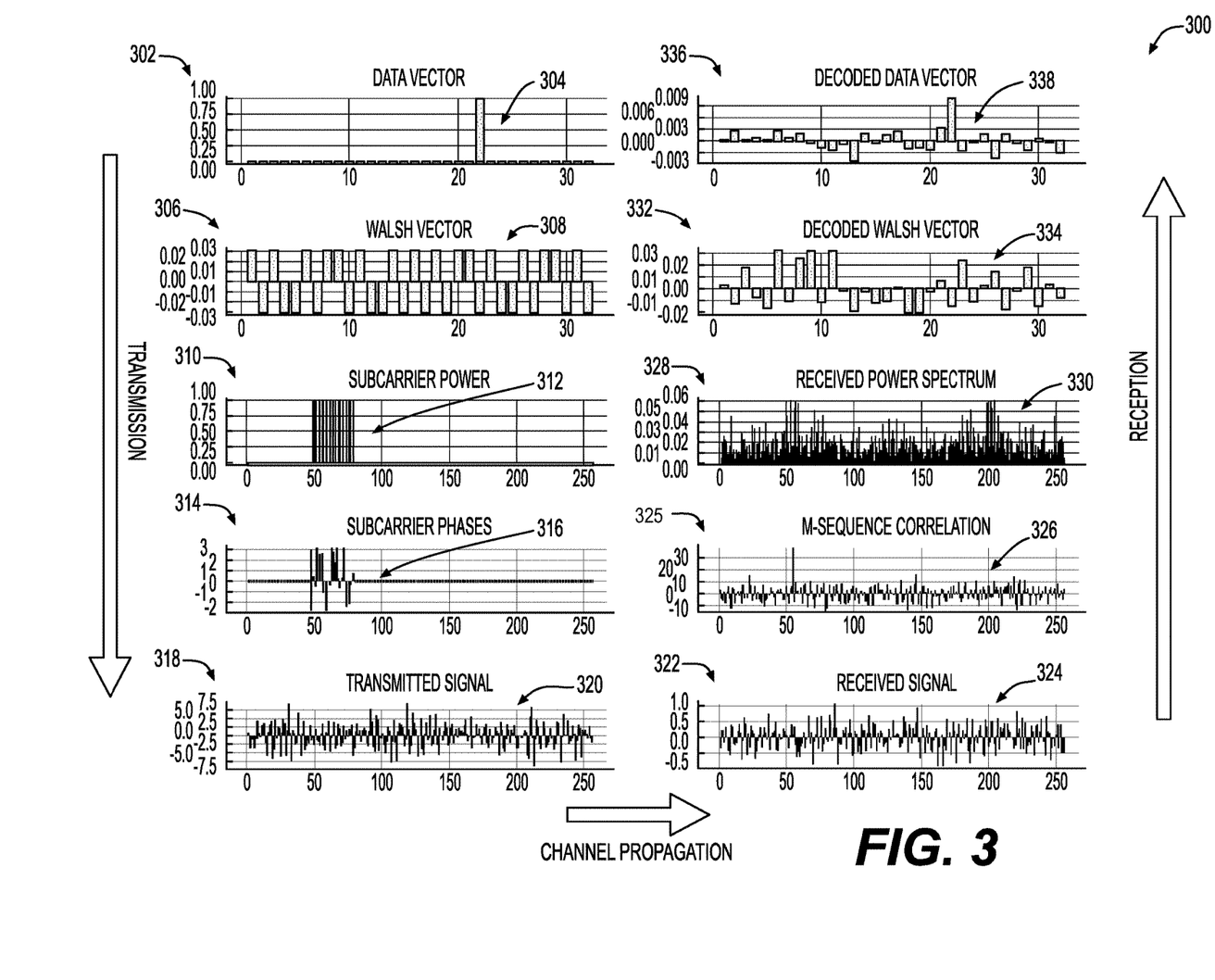
FIG. 3 illustrates a diagram of the transmitting phase and the receiving phase of an efficient physical layer for intrabody communication networks.

FIG. 3 illustrates a diagram of the transmitting phase and the receiving phase of an intrabody communication utilizing, for example, the efficient physical layer 200A described above with respect to FIG. 2A or the efficient physical layer 200B described above with respect to FIG. 2B. In some embodiments, the plots illustrated by FIG. 3 may each correspond to a simulated waveform. For example, during a transmitting phase, a plot 302 may illustrate a data symbol 304 (e.g., data symbol "22" out of an alphabet string of up to "31" individual data symbols) to be transmitted. A plot 306 may illustrate a set of Walsh spreading codes 308 corresponding to the data symbol 304, which has been encoded utilizing, for example, a Walsh-Hadamard spread-spectrum modulation scheme, in accordance with the presently disclosed techniques. A plot 310 may illustrate a frequency subcarrier power signal 312 (e.g., channel gain) generated based on, for example, the Walsh spreading codes 308. A plot 314 may then illustrate a set of frequency subcarriers 316 (e.g., discrete data signal in the frequency domain), which may be mapped, for example, to the individual Walsh spreading codes 308. Lastly, a plot 318 may illustrate a transmit signal 320 (e.g., continuous data signal in the time domain), which may be transmitted, for example, though the user body 100A, 100B via the one or more transmitting electrodes 218, 256 capacitively coupled to the user body 100A, 100B.

In certain embodiments, during a receiving phase, a plot 322 may illustrate a receive signal 324 (e.g., continuous data signal in the time domain) that may be received, for example, via the one or more receiving electrodes 220, 258 capacitively coupled to the user body 100A, 100B. A plot 325 may illustrate a frequency carrier signal 326 (e.g., including a set of frequency subcarriers corresponding to the receive signal 324 in the frequency domain). A plot 328 may illustrate a frequency sub carrier power signal 330 representing an amplification of the frequency carrier signal 326. A plot 332 may then illustrate a set of the Walsh spreading codes 334, which may correspond, for example, to a demapping of the individual frequency subcarriers of the frequency subcarrier power signal 330. Lastly, a plot 336 may illustrate a decoded data symbol 338, which may correspond, for example, to a decoding of the set of the Walsh spreading codes 334.

In certain embodiments, as may be ascertained through inspection of the originally transmitted data symbol 304 in plot 302 and the received decoded data symbol 338 in plot 336, the decoded data symbol 338 (e.g., data symbol "22") that corresponds to the highest probability in the distribution of plot 336 is commensurate with the originally transmitted data symbol 304 (e.g., data symbol "22"). In one embodiment, the decoded data symbol 338 in plot 336 may be correctly assigned by, for example, a factor of 3 or greater. This illustrates that the efficient physical layer 200A, 200B achieves highly accurate error correction, in accordance with the presently disclosed techniques. Similarly, as may be ascertained through inspection of the frequency subcarrier power signal 312 in plot 310 and the frequency subcarrier power signal 330 in plot 328, the efficient physical layer 200A, 200B achieves high coding and signal interference rejection, in accordance with the presently disclosed techniques. In this way, the presently disclosed techniques may provide improved channel characteristics (e.g., coding gain, error correction, signal interference rejection, and so forth) and modulation techniques (e.g., Walsh-Hadamard spread-spectrum modulation), and, by extension, may improve the efficiency and robustness of intrabody communication networks.

Figure 4:
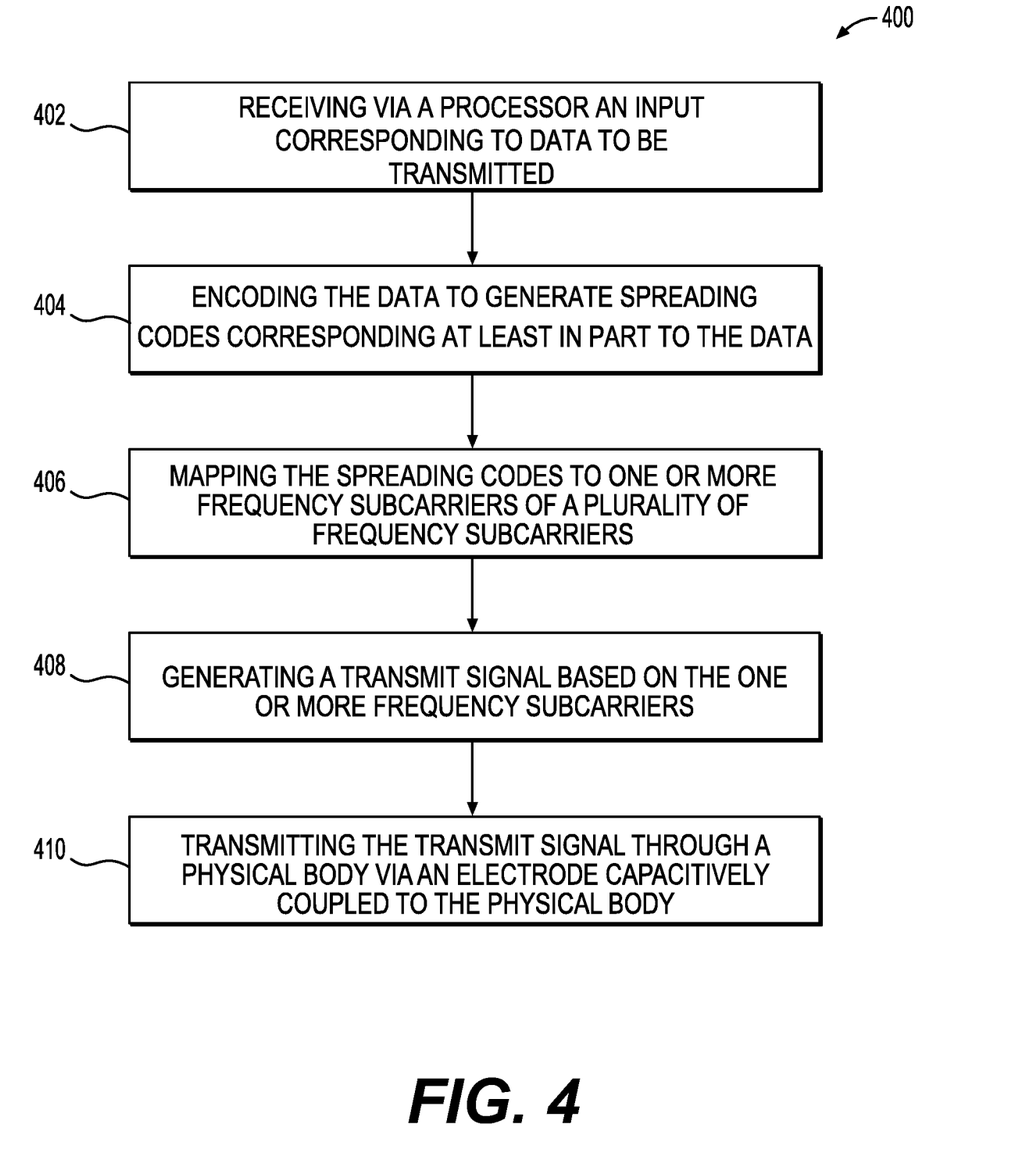
FIG. 4 illustrates a flow diagram of a method for providing an efficient physical layer for intrabody communication networks.

FIG. 4 illustrates is a flow diagram of a method 400 for providing an efficient physical layer for intrabody communication networks, in accordance with the presently disclosed embodiments. The method 400 may be performed utilizing one or more processing devices (e.g., physical layer 200A, 200B) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or some combination thereof.

The method 400 may begin at block 402 with the one or more processing devices (e.g., physical layer 200A, 200B) receiving an input data signal corresponding to one or more data symbols. For example, in some embodiments, the physical layer 200A, 200B may receive a data stream (e.g., bitstream), which may be subsequently encoded utilizing one or more convolutional encoders (e.g., [1, 2, 9] convolutional encoder) or an FEC encoder. Specifically, the convolutional encoders (e.g., [1, 2, 9] convolutional encoder) and/or the FEC encoder of the physical layer 200A, 200B may be utilized to enhance the reliability of the data stream by introducing redundancy (e.g., error correcting code).

The method 400 may continue at block 404 with the one or more processing devices (e.g., physical layer 200A, 200B) encoding the one or more data symbols into a matrix W to generate spreading codes corresponding to the one or more data symbols. For example, in certain embodiments, the physical layer 200A, 200B may encode the one or more data symbols into, for example, a Hadamard matrix (e.g., 8×8 Hadamard matrix, 16×16 Hadamard matrix, 32×32 Hadamard matrix, 64×64 Hadamard matrix, and so forth) of Walsh spreading codes to perform data error correction and autocorrelation.

The method 400 may then continue at block 406 with the one or more processing devices (e.g., physical layer 200A, 200B) mapping the spreading codes to one or more frequency subcarriers of a plurality of frequency subcarriers. For example, as previously discussed, the physical layer 200A, 200B may map the Walsh spreading codes to one or more frequency bins of, for example, a single frequency carrier channel (e.g., in a frequency channel range from approximately 100 kHz up to approximately 1.5 MHz) of up to 32 total frequency bins. The method 400 may then continue at block 408 with the one or more processing devices (e.g., physical layer 200A, 200B) generating a transmit signal based on the one or more frequency subcarriers. For example, in some embodiments, the physical layer 200A, 200B may utilize the IFFT block 210, 246 in conjunction with the DAC 212, 248 to convert a discrete data signal (e.g., discrete data signal including the one or more frequency subcarriers in the frequency domain) into a continuous data signal (e.g., a time-varying data signal in the time domain). The continuous data signal may be then amplified via the PA 214 and/or high voltage PA 252 before being input to the transmitter electrode selection and coupling network block 216, 254.

The method 400 may then conclude at block 410 with the one or more processing devices (e.g., physical layer 200A, 200B) transmitting the transmit signal through a physical body via an electrode capacitively coupled to the physical body. For example, in some embodiments, the transmitter electrode selection and coupling network block 216, 254 may be coupled to the transmitter electrodes 218, 256 for transmitting the transmit signal (e.g., continuous data signal) to, for example, the user body 100A, 100B.

In certain embodiments, as previously discussed above, the transmitter electrode selection and coupling network block 216, 254 may include a number of switches or MUXs for selecting one or more particular transmitter electrodes 218, 256, for example, to maximize a total differential capacitive coupling between the transmitter electrodes 218, 256 and the user body 100A, 100B. In this way, the presently disclosed techniques may provide improved channel characteristics (e.g., coding gain, error correction, signal interference rejection, and so forth) and modulation techniques (e.g., Walsh-Hadamard spread-spectrum modulation), and, by extension, may improve the efficiency and robustness of intrabody communication networks.

Furthermore, the presently disclosed techniques may allow various technical advantages and applications. For example, the presently disclosed efficient physical layer for intrabody communication networks may enhance the modes of interaction (e.g., user touch, user touch gestures, user hover) between users and personal electronic devices by providing the ability for users to more intimately interact with other users while, in most instances, only indirectly interacting with the user's personal electronic device (e.g.

simply grasping the personal electronic device using one hand, simply having the personal electronic device stowed into a pocket or carry-bag of the user, or simply having the personal electronic device worn on the wrist or around the neck of the user). That is, the personal electronic device of the user may transfer data between itself and one or more other external electronic devices (e.g., corresponding to other users) by way of the user simply touching the other user or the one or more other external electronic devices.

For example, in one instance, a personal electronic device of the user may be inside a shirt pocket of the user or simply worn on the wrist of the user, and the user may be allowed to unlock an electronic door lock by manually grasping the handle to the door (e.g., without the user removing the personal electronic device from her pocket and without the user lifting the personal electronic device worn on her wrist to the electronic door lock). In another instance, the user may be allowed, for example, to exchange business cards or other information through a simple handshake with another user, a hug of another user, a tap on the shoulder of another user, or a handwave to another user closely proximate to the user. Still, in another instance, the user may be allowed to be authorized or authenticated via a public reader or other device, and thus making a secure personalized experience without any explicit sign-in process having to be performed by the user. It should be appreciated that these practical applications are included merely as examples, in actual implementation, the presently disclosed techniques may be applied in any of various technical applications. Moreover, while the presently disclosed embodiments may be discussed herein primarily with respect to a human anatomy, it should be appreciated that the presently disclosed techniques may be applied with respect to any somatic medium (e.g., humans, animals, insects, certain organisms, and so forth). For example, in one instance, an electronic collar or other wearable device attached to the anatomy of a pet (e.g., puppy, kitten) may be used to allow the pet to access an electronically locked door or fence, temporarily disable invisible fencing, or other similar application.

Figure 5:
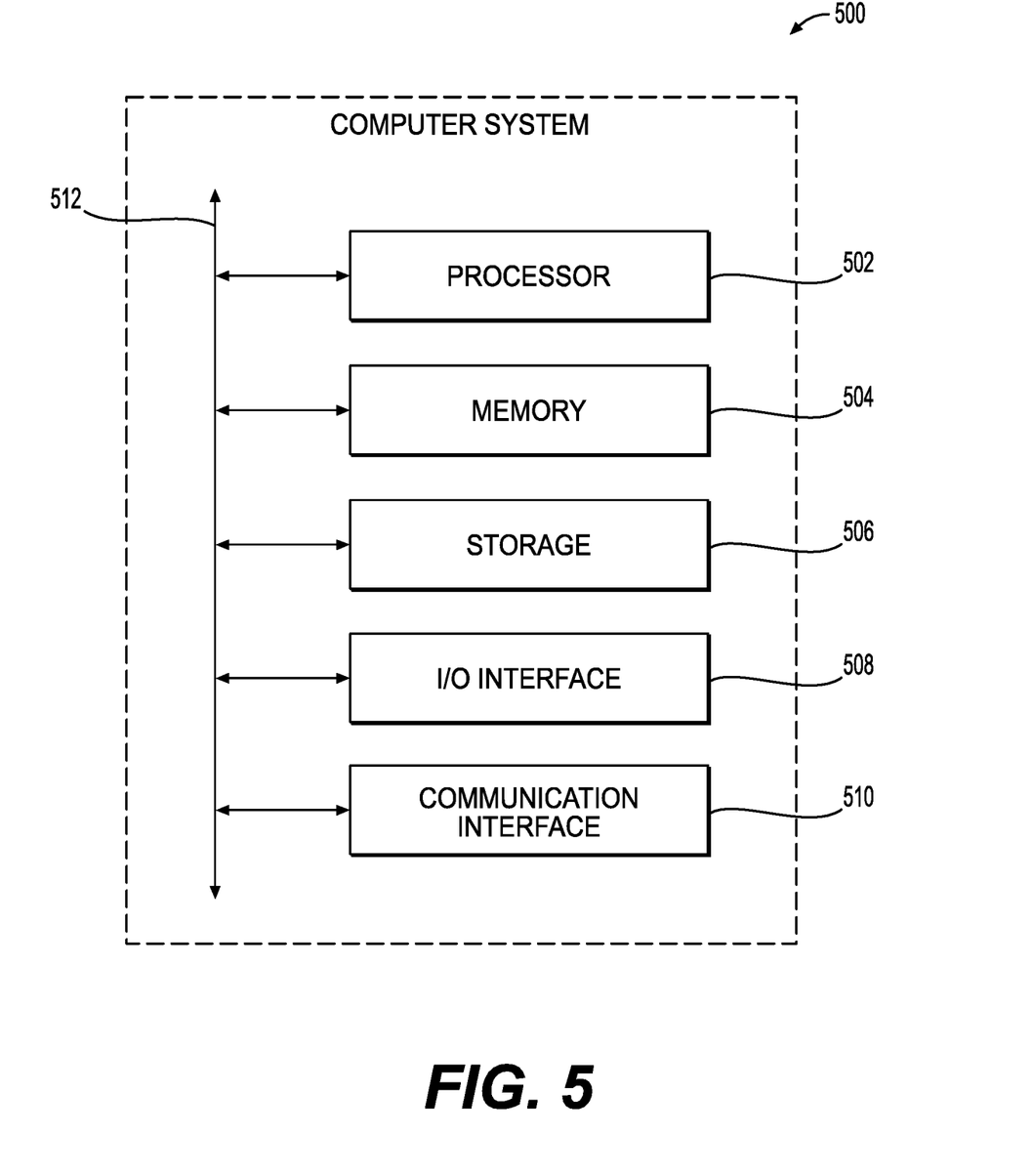
FIG. 5 illustrates an example computer system.

FIG. 5 illustrates an example computer system 500 that may be useful in performing one or more of the foregoing techniques as presently disclosed herein. In certain embodiments, one or more computer systems 500 perform one or more steps of one or more methods described or illustrated herein. In certain embodiments, one or more computer systems 500 provide functionality described or illustrated herein. In certain embodiments, software running on one or more computer systems 500 performs one or more steps of one or more methods described or illustrated herein or provides functionality described or illustrated herein. Certain embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks.

Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In certain embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement. In certain embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In certain embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502.

Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In certain embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 402. Although this disclosure describes and illustrates a particular processor, this disclosure contemplates any suitable processor.

In certain embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504.

Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In certain embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In certain embodiments, one or more memory management units (MMUs) reside between processor 502 and memory 504 and facilitate accesses to memory 504 requested by processor 502. In certain embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In certain embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In certain embodiments, storage 506 is non-volatile, solid-state memory. In certain embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In certain embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In certain embodiments, communication interface 510 includes hardware, software, or both providing one or more interfaces for communication (such as, for example, packet-based communication) between computer system 500 and one or more other computer systems 500 or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In certain embodiments, bus 512 includes hardware, software, or both coupling components of computer system 500 to each other. As an example, and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Herein, "automatically" and its derivatives means "without human intervention," unless expressly indicated otherwise or indicated otherwise by context.

The embodiments disclosed herein are only examples, and the scope of this disclosure is not limited to them. Embodiments according to the embodiment are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method implemented by a computing device, the method comprising:
   receiving an input via a processor of the computing device, wherein the input includes data to be transmitted;
   encoding the data to generate spreading codes corresponding at least in part to the data;
   mapping the spreading codes to one or more frequency subcarriers of a plurality of frequency subcarriers;
   generating a transmit signal based at least in part on the one or more frequency subcarriers;
   determining one or more transmitter electrodes, from a plurality of electrodes of the computing device, that maximize a differential capacitive coupling to a physical body;
   selecting the determined one or more transmitter electrodes to be transmission electrodes for transmitting the transmit signal to the physical body;
   amplifying the transmit signal for transmission to the selected one or more transmitter electrodes of the computing device; and
   transmitting the amplified transmit signal via the selected one or more transmitter electrodes capacitively coupled to the physical body, the transmit signal being transmitted from the selected one or more transmitter electrodes through the physical body.

2. The method of claim 1, wherein encoding the data to generate the spreading codes comprises encoding the data utilizing a Hadamard matrix, and wherein the spreading codes comprise Walsh spreading codes.

3. The method of claim 1, wherein the data comprises one or more [n, k, m] convolutional codes, and wherein encoding the data to generate spreading codes comprises encoding the data with a [n, k, m] convolutional encoder to generate convolution codes and transforming the convolution codes into the spreading codes.

4. The method of claim 1, wherein mapping the spreading codes to one or more frequency subcarriers comprises mapping the spreading codes to one or more frequency bins in a frequency channel range of 100 kilohertz (kHz) to 1.5 megahertz (MHz).

5. The method of claim 1, wherein the transmit signal is amplified to a voltage of approximately 24 volts (V).

6. The method of claim 1, wherein the spreading codes comprise a first set of Walsh spreading codes, the method further comprising:
   receiving a receive signal via a second electrode capacitively coupled to the physical body, the receive signal being received at the second electrode from the physical body;
   converting the receive signal into a discrete data signal, the discrete data signal including one or more other frequency subcarriers;
   translating the one or more other frequency subcarriers into a second set of Walsh spreading codes;
   translating the second set of Walsh spreading codes to correspond at least in part to one or more data symbols; and
   decoding, via a Viterbi decoder, the one or more data symbols to retrieve data included in the receive signal.

7. The method of claim 1, wherein selecting the one or more transmitter electrodes for transmitting the transmit signal to the physical body comprises operating one or more switches to select the one or more transmitter electrodes.

8. A system comprising: one or more non-transitory computer-readable storage media including instructions; and one or more processors coupled to the storage media, the one or more processors configured to execute the instructions to:
receive an input including data to be transmitted;
encode the data to generate spreading codes corresponding at least in part to the data;
map the spreading codes to one or more frequency subcarriers of a plurality of frequency sub carriers;
determine one or more transmitter electrodes, from a plurality of electrodes of a computing device, that maximize a differential capacitive coupling to a physical body;
select the determined one or more transmitter electrodes to be transmission electrodes for transmitting the transmit signal to the physical body;
amplify the transmit signal for transmission to the selected one or more transmitter electrodes of the computing device;
generate a transmit signal based at least in part on the one or more frequency subcarriers; and
transmit the amplified transmit signal via the selected one or more transmitter electrodes capacitively coupled to the physical body, the transmit signal being transmitted from the selected one or more transmitter electrodes through the physical body.

9. The system of claim 8, wherein the instructions to encode the data to generate the spreading codes comprises instructions to encode the data utilizing a Hadamard matrix, and wherein the spreading codes comprise Walsh spreading codes.

10. The system of claim 8, wherein instructions to encode the data to generate spreading codes comprises instructions for encoding the data with a [n, k, m] convolutional encoder to generate convolution codes and for transforming the convolution codes into the spreading codes.

11. The system of claim 8, wherein the instructions to map the spreading codes to one or more frequency subcarriers comprises instructions to map the spreading codes to one or more frequency bins in a frequency channel range of 100 kilohertz (kHz) to 1.5 megahertz (MHz).

12. The system of claim 8, wherein the instructions to amplify the transmit signal for transmission comprise instructions to amplify the transmit signal to a voltage of approximately 24 volts (V).

13. The system of claim 8, wherein the spreading codes comprise a first set of Walsh spreading codes, the instructions further comprise instructions to:
receive a receive signal via a second electrode capacitively coupled to the physical body, the receive signal being received at the second electrode from the physical body;
convert the receive signal into a discrete data signal, the discrete data signal including one or more other frequency subcarriers;
translate the one or more other frequency subcarriers into a second set of Walsh spreading codes;
translate the second set of Walsh spreading codes to correspond at least in part to one or more data symbols; and
decode, via a Viterbi decoder, the one or more data symbols to retrieve data included in the receive signal.

14. The system of claim 8, wherein the instructions to select the one or more transmitter electrodes for transmitting the transmit signal to the physical body further comprises instructions to operate one or more switches to select the one or more transmitter electrodes.

15. A non-transitory computer-readable medium comprising instructions that, when executed by one or more processors of a computing system, cause the one or more processors to:
receive an input including data to be transmitted;
encode the data to generate spreading codes corresponding at least in part to the data;
map the spreading codes to one or more frequency subcarriers of a plurality of frequency sub carriers;
determine one or more transmitter electrodes, from a plurality of electrodes of a computing device, that maximize a differential capacitive coupling to a physical body;
select the determined one or more transmitter electrodes to be transmission electrodes for transmitting the transmit signal to the physical body;
amplify the transmit signal for transmission to the selected one or more transmitter electrodes of the computing device;
generate a transmit signal based at least in part on the one or more frequency subcarriers; and
transmit the amplified transmit signal via the selected one or more transmitter electrodes capacitively coupled to the physical body, the transmit signal being transmitted from the selected one or more transmitter electrodes through the physical body.

16. The non-transitory computer-readable medium of claim 15, wherein the instructions that cause the one or more processors to encode the data to generate the spreading codes comprises instructions to encode the data utilizing a Hadamard matrix, and wherein the spreading codes comprise Walsh spreading codes.

17. The non-transitory computer-readable medium of claim 15, wherein the instructions that cause the one or more processors to encoding encode the data to generate spreading codes comprises instructions to encode the data with a [n, k, m] convolutional encoder to generate convolution codes and transform the convolutional codes into the spreading codes.

18. The non-transitory computer-readable medium of claim 15, wherein the instructions that cause the one or more processors to map the spreading codes to one or more frequency subcarriers comprises instructions to map the spreading codes to one or more frequency bins in a frequency channel range of 100 kilohertz (kHz) to 1.5 megahertz (MHz).

19. The non-transitory computer-readable medium of claim 15, wherein the instructions to amplify the transmit signal for transmission comprise instructions to amplify the transmit signal to a voltage of approximately 24 volts (V).

20. The non-transitory computer-readable medium of claim 15, wherein the spreading codes comprise a first set of Walsh spreading codes, the instructions further comprise instructions that cause the one or more processors to:
receive a receive signal via a second electrode capacitively coupled to the physical body, the receive signal being received at the second electrode from the physical body;
convert the receive signal into a discrete data signal, the discrete data signal including one or more other frequency subcarriers;
translate the one or more other frequency subcarriers into a second set of Walsh spreading codes;

translate the second set of Walsh spreading codes to correspond at least in part to one or more data symbols; and decode, via a Viterbi decoder, the one or more data symbols to retrieve data included in the receive signal.

* * * * *